United States Patent
Yadid-Pecht et al.

(10) Patent No.: US 6,175,383 B1
(45) Date of Patent: Jan. 16, 2001

(54) METHOD AND APPARATUS OF HIGH DYNAMIC RANGE IMAGE SENSOR WITH INDIVIDUAL PIXEL RESET

(75) Inventors: Orly Yadid-Pecht, Arcadia; Bedabrata Pain, Los Angeles; Eric R. Fossum, La Crescenta, all of CA (US)

(73) Assignee: California Institute of Technology, CA (US)

( * ) Notice: Under 35 U.S.C. 154(b), the term of this patent shall be extended for 0 days.

(21) Appl. No.: 08/744,956

(22) Filed: Nov. 7, 1996

Related U.S. Application Data

(60) Provisional application No. 60/006,263, filed on Nov. 7, 1995.

(51) Int. Cl.[7] ....................................... H04N 3/14
(52) U.S. Cl. ........................................ 348/302; 348/297
(58) Field of Search ................... 348/257, 291, 348/292, 296, 297, 301, 302, 306, 307, 308

(56) References Cited

U.S. PATENT DOCUMENTS

| | | | |
|---|---|---|---|
| 4,589,024 | * 5/1986 | Koch et al. | 348/297 |
| 4,706,123 | * 11/1987 | Chautemps | 348/297 |
| 5,468,954 | * 11/1995 | Furukawa | 348/297 |
| 5,541,654 | * 7/1996 | Roberts | 348/301 |
| 5,841,126 | * 11/1998 | Fossum et al. | 348/308 |
| 5,881,184 | * 3/1999 | Guidash | 382/321 |
| 5,892,541 | * 4/1999 | Merrill | 348/302 |

OTHER PUBLICATIONS

Chen S. and Ginosar R., "Adaptive sensitivity CCD image sensor", SPIE vol. 2415, pp. 303–309, 1995.
Cochrun B.L., "Linear infrared charged coupled device focal plane with programmable stare time", SPIE vol. 501, pp. 157–163, 1984.
Yadid–Pecht O., "The Automatic Wide Dynamic Range Sensor (AWDRS)", 1993 SID Intl. Symp., Seattle, Washington, pp. 495–498, May 1993.

* cited by examiner

*Primary Examiner*—Wendy Garber
*Assistant Examiner*—Alicia M. Harrington
(74) *Attorney, Agent, or Firm*—Fish & Richardson P.C.

(57) ABSTRACT

A wide dynamic range image sensor provides individual pixel reset to vary the integration time of individual pixels. The integration time of each pixel is controlled by column and row reset control signals which activate a logical reset transistor only when both signals coincide for a given pixel.

13 Claims, 7 Drawing Sheets

METHOD AND APPARATUS OF HIGH DYNAMIC RANGE IMAGE SENSOR WITH INDIVIDUAL PIXEL RESET

This application claims the benefits of the U.S. Provisional Application No. 60/006,263, filed on Nov. 7, 1995.

ORIGIN OF THE INVENTION

The invention described herein was made in the performance of work under a NASA contract, and is subject to the provisions of Public Law 96-517 (35 U.S.C. 202), in which the contractor has elected to retain title.

FIELD OF THE INVENTION

The present invention defines an improved active pixel sensor. More specifically, the present invention defines an active pixel sensor having individual pixel reset to permit regional electronic shuttering and a high dynamic range.

BACKGROUND AND SUMMARY OF THE INVENTION

There are many applications for active pixel image sensors, including scientific, as well as commercial and consumer applications. Active pixel sensors, for example, as described in U.S. Pat. No. 5,471,515, integrate the readout sensor as part of the pixel electronics. The special techniques of active pixel sensing allow using a semiconductor family formation process which is compatible with CMOS, e.g., NMOS. This technique enables the readout electronic to be integrated on the wafer using a similar process. The result is a high performance sensor with high quantum efficiency and low dark current.

One example of an application for active pixel sensors is in guidance systems in spacecraft. These guidance systems determine spacecraft attitude by matching an observed starfield to a star-catalog. These celestial star-tracker systems should be small in mass and power consumption, be radiation hard, have a high fill factor, and high sampling resolution. Since a star-tracker centroids an intentionally blurred star image, the effect of pixel geometry on the centroiding algorithm should be minimal. An active pixel sensor-based system can reduce mass and power consumption and radiation affects compared to a CCD-based system.

Spacecraft star-tracker systems may be required to image sections whose images vary by $10^8$ ratio relative to one another, e.g. the difference in brightness between the brightness of a nearby planet and the brightest stars. As result, the dynamic range of these devices becomes a crucial issue. Prior suggested solutions for widening the dynamic range of active pixel sensors fall into three basic categories: compressing the response curve, clipping the response, and control over integration time. The first two methods result in loss of some kind of detail in the image. This has led the inventors to consider the third—this can be done either externally or internally.

External control over integration time is generally preferred, and can be done either globally or locally. Global control over integration time has been achieved via electronic or mechanical shuttering, as well as by other means. The inventors found, however, that global control does not work well when viewing a scene that itself includes a wide dynamic range. This is because part of the sensor might be saturated or exposed below its minimum threshold, resulting respectively, in white or black patches in the picture. For example, when using a charge-coupled device (CCD) system, a single integration period for the entire sensor is normally required. This means that either a bright star is properly exposed, and a dim star is lost in the noise; or, the dim star is properly exposed, but the bright star is saturated and useless for centroiding.

Attempts have been made to implement local exposure control in active pixel sensors. However, these solutions have generally resulted in reduced fill-factor, which is not appropriate to many applications. Fill-factor is the ratio of the pixel area that is responsive to light, divided by the total area of the pixel. A low fill-factor will result in reduced resolution and/or excessively large arrays.

The present inventors have recognized that local exposure control would be desirable since it would permit a different integration period for different areas of the sensor. In star-tracker applications a different integration period for each star would make it possible to sense both bright and dim stars at the same time.

While the above has described use with stars, it should be understood that any variable image could similarly be imaged. According to one aspect of the invention, each individual pixel can be reset in an active pixel sensor (APS) pixel. This is accomplished using two reset transistors instead of a single reset transistor as in prior APS pixel circuitry. These two reset transistors are coupled to column reset and row reset lines. Both column and row reset lines must be on before the APS is reset. This enables individual control over the reset, and consequently the integration time, for each APS. Additional row and column controls are required to achieve individual pixel reset onto the image sensor. In addition to the conventional row-read control, a row-reset control is provided. Likewise, a column reset control unit is added to the conventional column-readout control. The column and row-reset controls in the invention are used to activate the column reset APS's individually.

The invention is a significant improvement over prior individual pixel reset APS designs. For example, some of these prior APSs used a second transistor in series with the row-reset transistor, activated by a vertical column-reset signal. This design may introduce reset anomalies when used in CMOS readout circuits for infrared focal-plane-arrays. It is believed this is due to charge pumping from the output node to the reset drain. An object of the present invention is to overcome these disadvantages and to provide an active pixel sensor with individual pixel reset which allows control over the integration time of each pixel individually.

The individual pixel reset (IPR) APS of the invention can be used to achieve a very wide dynamic range. Dynamic range can be modified by changing the integration time, which is the time that the pixel is exposed to incoming light. Integration time begins with a reset signal and ends with a sample signal. In prior APSs having global control, pixels are all reset and sampled at the same time. The present invention determines the reset time for each pixel individually. This allows each pixel to have a different integration. Reset is commenced by simultaneously activating both column and row reset control lines for a particular pixel at the same time. Sampling is accomplished at the same time for all the pixels. Thus, the time between reset and sample for each pixel will vary as desired simply by varying the reset time for each pixel.

The invention adds only a single additional transistor in each pixel as compared to previous (APS) designs. Because of this, the effect on fill-factor is minimal. This is in contrast to previously reported APS designs that require circuitry that results in large reduction in fill-factor to achieve local exposure control.

In accordance with the invention, different integration times can be set according to the intensity of the incident light. This allows the APS to have an extremely wide dynamic range. By sensing the light levels for each pixel in real-time and adjusting the integration times accordingly, the APS can accommodate light intensities which vary spatially, as well as temporally, over a wide dynamic range. Also, the minimum integration time can be varied according the illuminance level of different pixels. In contrast, the minimum integration time is constant in CCDs and in conventional APSs. This enables viewing details in high illumination areas, that would otherwise be lost using prior compression-like solutions for widening the dynamic range.

BRIEF DESCRIPTION OF THE DRAWINGS

All of these aspects and others will be described with reference to the accompanying drawings, wherein.

DESCRIPTION OF THE PREFERRED EMBODIMENTS

Figure 1:
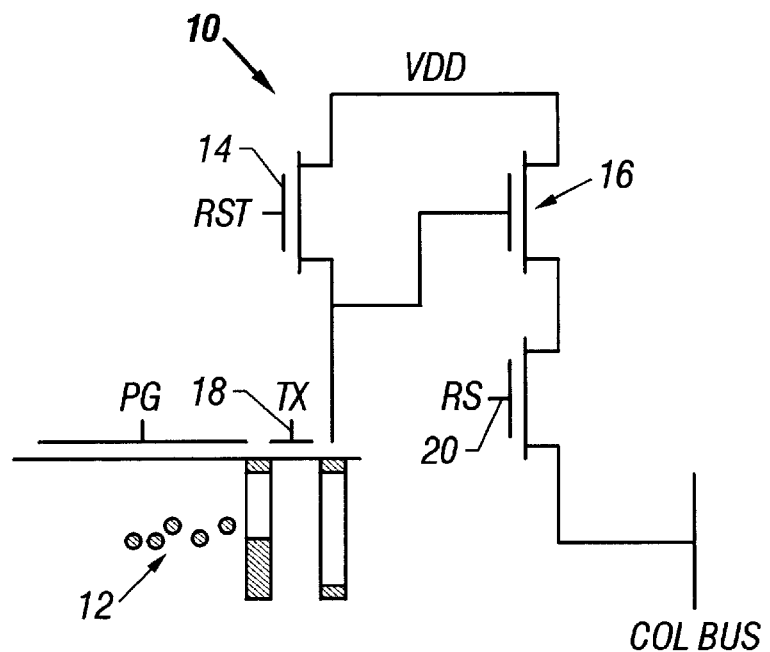
FIG. 1 shows a photogate type active pixel sensor (APS) pixel circuit in accordance with the prior art.

A presently preferred embodiment of the active pixel sensor with regional electronic shuttering is set forth herein with reference to the accompanying drawings. FIG. 1 shows a conventional photogate type APS pixel. This pixel circuitry 10 includes a photogate type detector 12, a single reset transistor 14, readout source follower circuitry 16, a transfer gate 18 and a row selection transistor 20.

Figure 2:
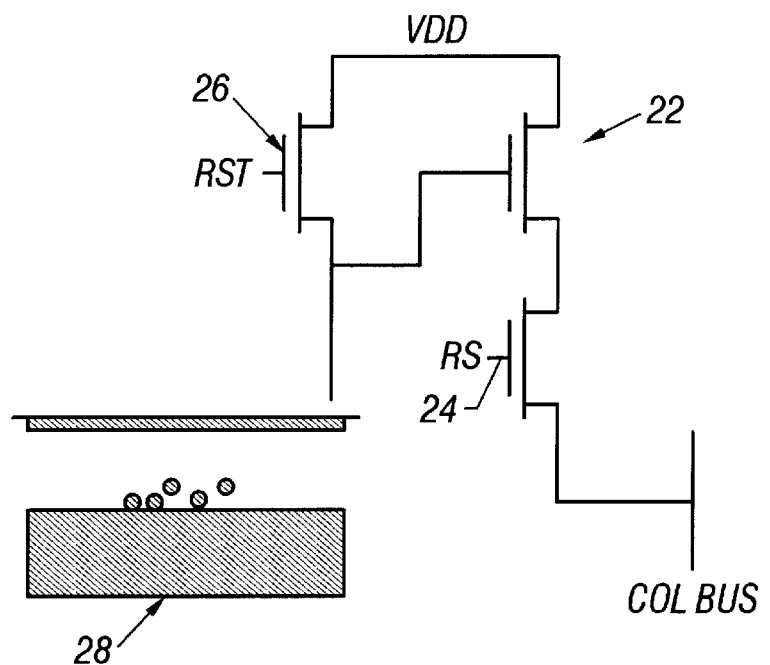
FIG. 2 shows a photodiode-type APS pixel circuitry in accordance with the prior art.

FIG. 2 shows a photodiode type APS circuitry 22. It also includes row select transistor 24 and reset transistor 26; but uses a photodiode 28 as the light receives element instead of a photogate.

Both the prior art pixels shown in FIGS. 1 and 2 connect all the reset transistor gates in a given row in parallel. As a result, the entire row is reset when the reset line is activated. The integration period is the time from the pixel reset to the pixel readout. Individual pixel reset is required for pixels on the same row to have different integration periods. This is not possible with these prior designs. Conventional circuitry at the bottom of the column (e.g. load transistor, sample and hold circuitry) is not shown for simplicity and are well known in the art.

Figure 3:
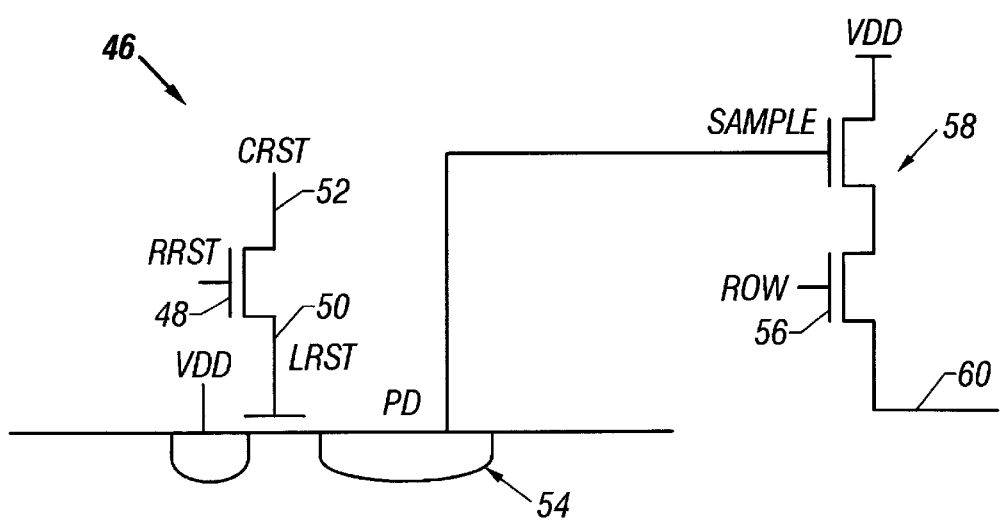
FIG. 3 shows an APS pixel with individual pixel reset circuitry in accordance with the invention.

FIG. 3 shows the individual pixel reset (IPR) APS 46 pixel circuitry of the invention. It includes a photodiode sensor 54, row selection transistor 56, a row reset transistor 48 and readout source-follower circuitry 58, which is coupled to the column bus 60. Logical reset transistor 50 has its gate coupled to the row reset transistor 48. In this design both the column reset line 52 and row reset transistor 48 must be at a logical high voltage to activate the logical reset transistor 50, which in turn resets the APS 46.

This relatively simple configuration allows low noise, anomaly-free readout. It permits the implementation of a smaller pixel with higher fill factor compared to previous pixels with local exposure control. It should be noted that non-destructive readout of the pixel can be performed at any time during the integration period by activating the row select transistor 56 and reading the voltage on the column bus 60. Nondestructive readout can also be used to determine the optimum exposure period for a given region of interest.

In operation, when both the row reset 48 and the column reset line 52 are simultaneously active, then the logical reset transistor 50 will turn on and the pixel will be reset. Otherwise, the row reset transistor 48 passes a low voltage which does not further activate the logical reset transistor 50.

Thus, when the APS 46 receives coinciding column reset and row reset signals, the logical reset 50 is activated and the APS is reset. The timing of the coincidence between the row reset and column reset signals determines the modified integration point. Since the ending point stays the same, a variable integration time is achieved by properly timing the beginning of the logical reset 50.

Figure 5:
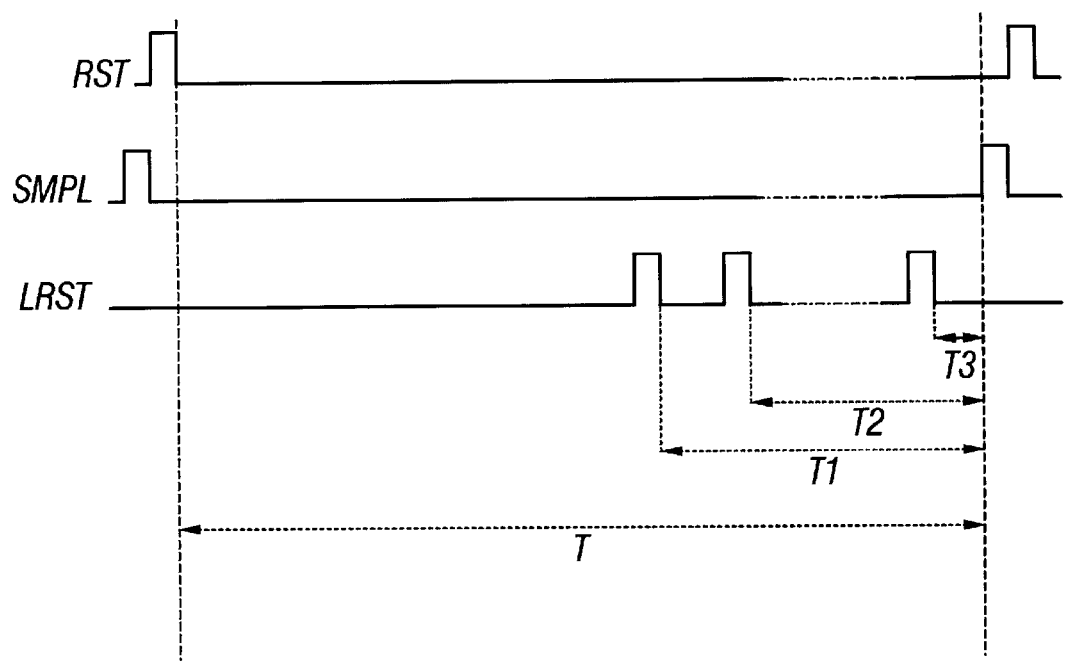
FIG. 5 shows a timing diagram of the sample and reset operation to achieve high dynamic range in accordance with the invention.
Figure 6A:
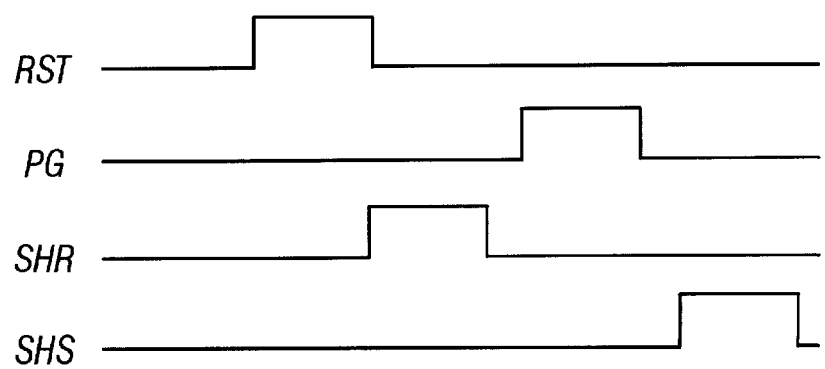
FIG. 6 shows a photograph of a fabricated test chip in accordance with the invention.
Figure 6B:
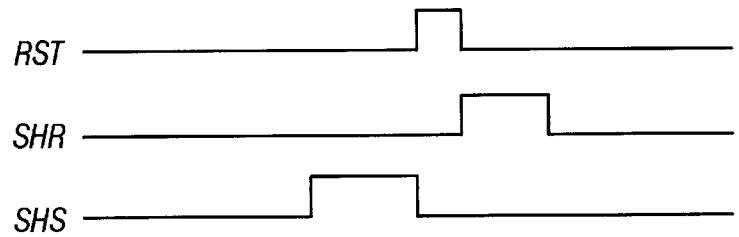

FIG. 5 shows that following a reset (RST), all previous charge from a previous integration period is emptied from the pixel. This begins when the total available integration time T. The sample line (SMPL) shows a previous sample which is followed by a reset pulse (RST). At a predetermined time, for any given pixel, when the column and row reset signals coincide, the logical reset transistor 50 will be on and the integration time will begin. The total available integration time T ends with the next sample pulse (SMPL). At this time the charge is received on the column bus and read by the readout circuitry, as described below. Three examples of three different integration times are shown in FIG. 6 labeled T1, T2 and T3. It will be appreciated that the integration time can be set for any pixel individually, to begin any time within in the region T of total available integration time.

Figure 4:
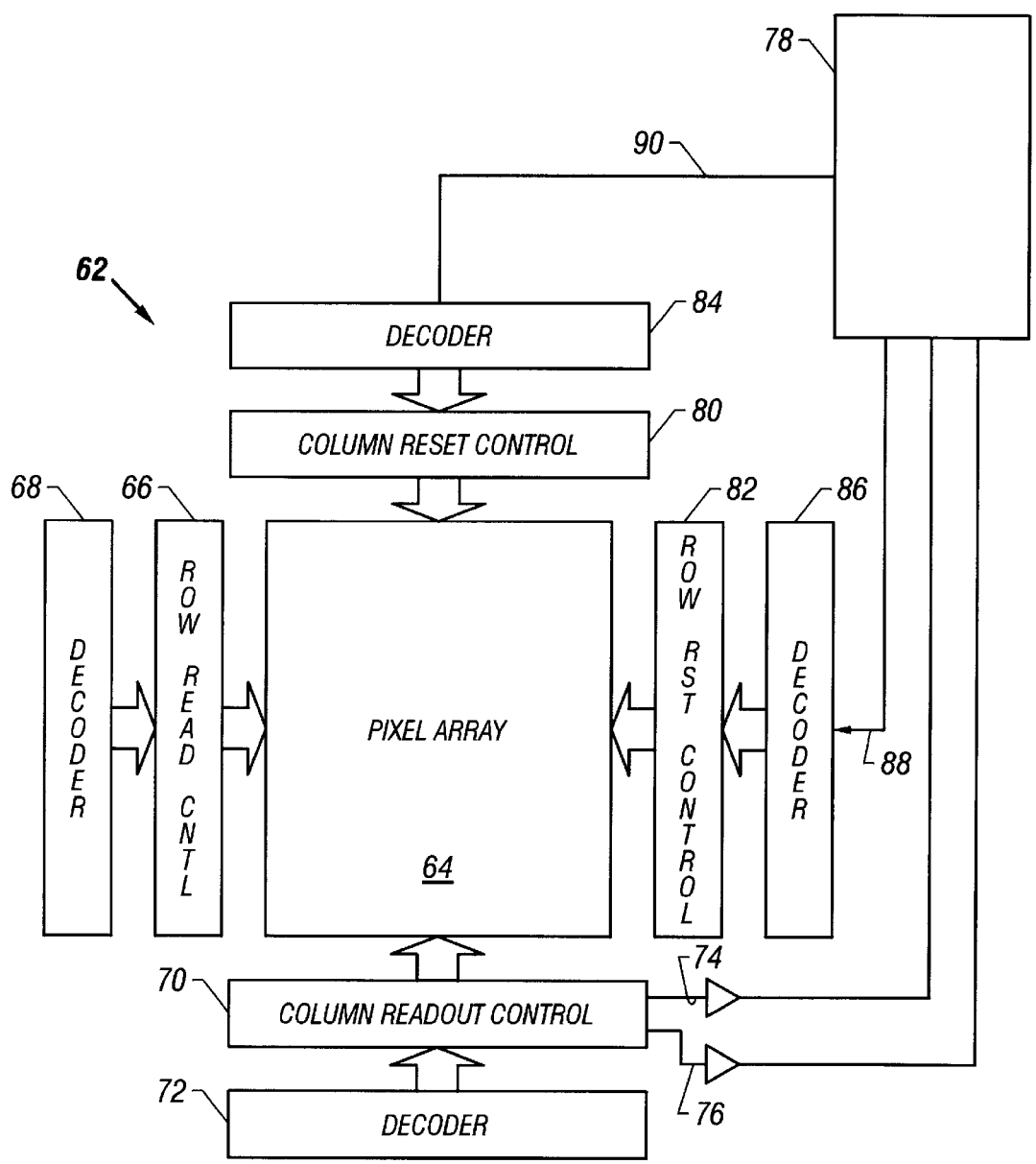
FIG. 4 shows the basic chip architecture of the invention.

The chip architecture of the invention is shown in FIG. 4. The APS pixel 62 includes a conventional pixel sensor array 64; conventional row read control 66 with decoder 68; and conventional column readout control 70 with a conventional decoder input 72. In general, these elements operate in a conventional manner to readout information. That is, a signal sent to the decoder 68 direct the row read control to select a row. Likewise, a signal sent to the decoder 72 activates the decoder to direct the column readout control to select a sequence of columns. For each row selected, the column readout control will sequentially read out each pixel value in the row from left to right. This output will comprise a differential signal which is output on the sample ($V_{out}S$) 74 and reset ($V_{out}R$) 76 outputs. Voltage $V_{out}R$ 76 is the voltage level during reset, and $V_{out}S$ 74 is the voltage level at the sample time. These outputs are directed to a processor 78.

In accordance with this embodiment of the invention, in order to effect independent reset and readout per pixel, additional sets of row and column controls are used. The column reset control 80 and row reset control 82 receive commands from the decoders 84 and 86, respectively, which interpret incoming control signals. For example, for a given pixel, the column reset 80 activates the column reset line 52, shown in the APS pixel 46 in FIG. 4. Likewise the row reset control activates the row reset transistor 48 in the APS pixel 46.

When the row and column reset signals coincide, the logical reset 50 is activated and the integration time begins. This integration time will terminate at the time of the sample signal, as shown in FIG. 5. In this way, the column and reset controls 80, 82 permit independently resetting any pixel address within the array, without interfering with the readout process.

Referring again to FIGS. 4 and 5, initially, the pixel array 64 will sense the illumination and generate a voltage. The voltage is then passed for readout during the sampling time. A signal (RST) starts the integration time by resetting, or precharging, the sensor. Another signal (SMPL) determines the end of the integration time T. In response to the sample signal, the voltage passes to the readout circuit.

In most prior APS designs, all of the pixels have a fixed integration time of T. Consequently, if the illumination is high, the sensors might get saturated and no meaningful information will be passed on. Conversely, if the illumination is low and the integration time is not appropriate, the output voltage is too low. Thus, only a limited range of intensities can be correctly recovered with such sensors. If a second reset is given to a pixel by means of the logical reset 50 (LRST) before the end of the regular integration period, a shorter effective integration time is achieved.

FIG. 5 shows three examples of three integration times T1, T2 and T3. Processor 78, having received the signal for a pixel from signals 74 and 76, will be able to determine the intensity at a given pixel and modify its integration time accordingly. Once the proper integration time is determined, this information is sent on lines 88 and 90 to the column and row reset controls 80, 82 to control the integration time for that pixel and subsequent readout. This allows the processor to keep each pixel within a desired dynamic range.

Not only is the integration time adjustable for each given pixel independently, but a dynamic modification in the integration time for each pixel can be made in real-time in response to the instaneous intensities. Of course, the actual intensity will be calculated as a function of the variable integration time and the magnitude of the measured signal.

A monolithic semiconductor APS test chip in accordance with the invention was implemented as an array of 64×64 photodiode-APS elements.

Functional testing of the test chip with the pixel resetting circuitry confirmed the operability of the individual pixel reset operation. To simplify imager operation so that the output could be readily observed on a monitor, regions of the chip spanning the entire width of the sensor were selected for reset, resulting in a region of less-exposed rows.

Figure 7:
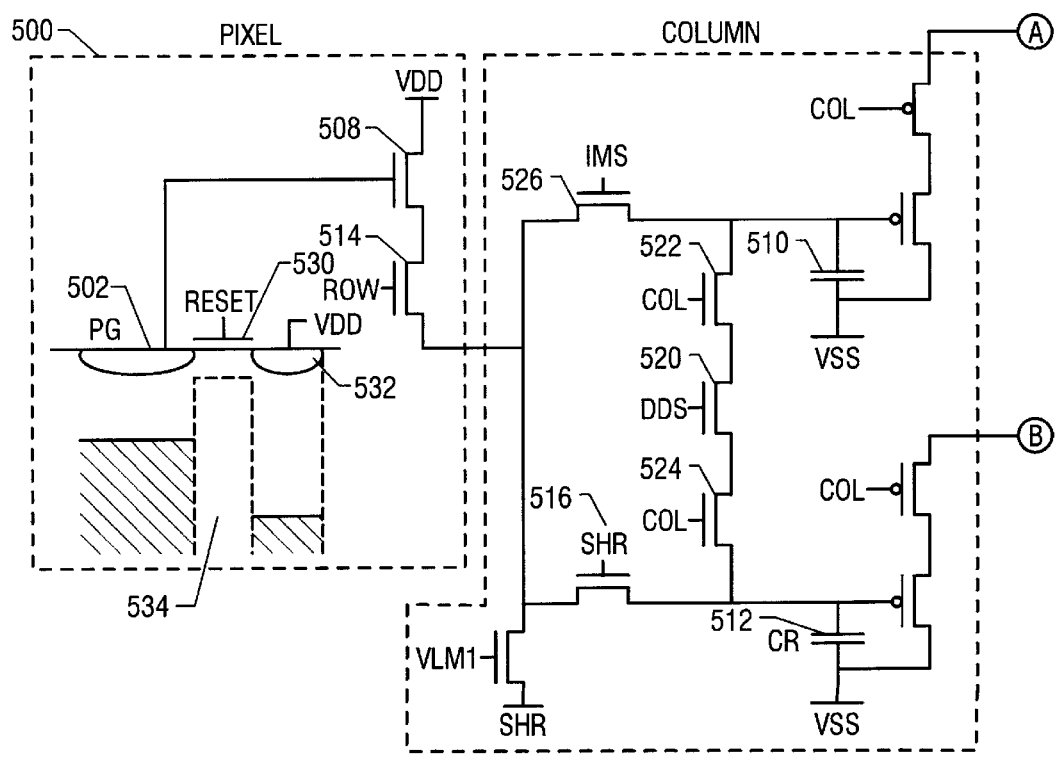
FIG. 7 shows sensor output in which part of the picture has a short integration time in accordance with the invention.
Figure 8:
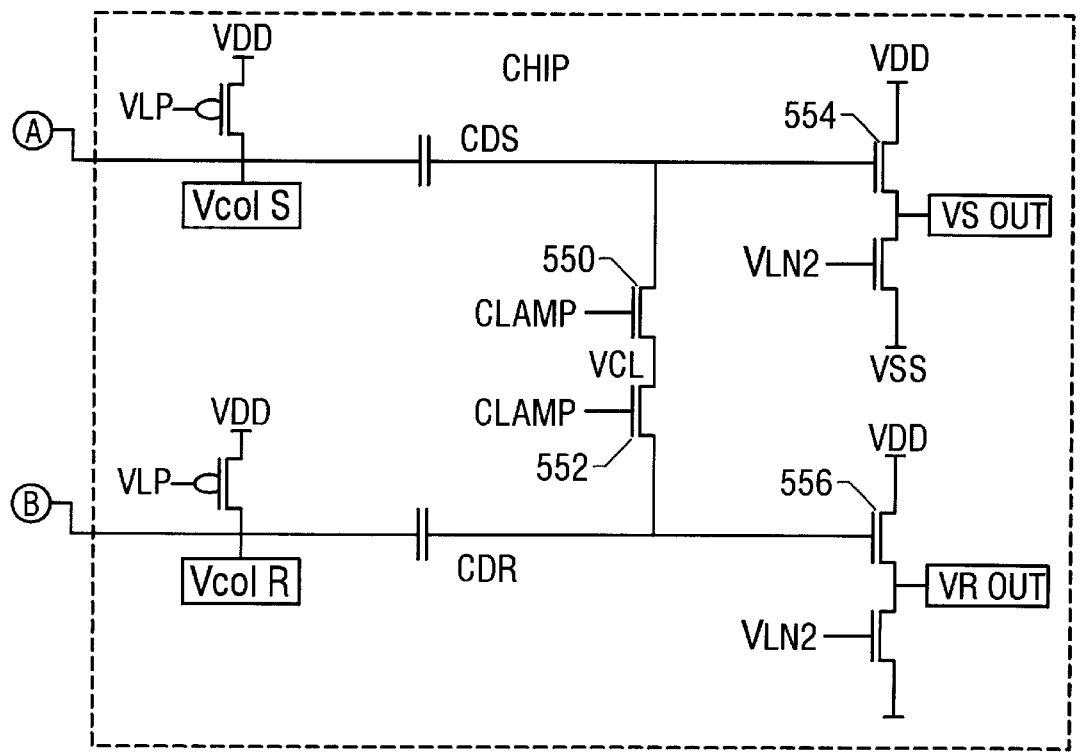
FIG. 8 shows sensor output for a long integration time in accordance with the invention.

A pair of output images is shown in FIGS. 7 and 8. The image in FIG. 7 shows the output of sensor where the display is optimized for the majority of the image. The black band across the image represents pixels that were reset during the nominal integration time, so that they had a shorter effective integration time. When the display is optimized for these pixels, the image in FIG. 8 results. The other pixels in the majority of the image appear saturated, or white.

Figure 9:
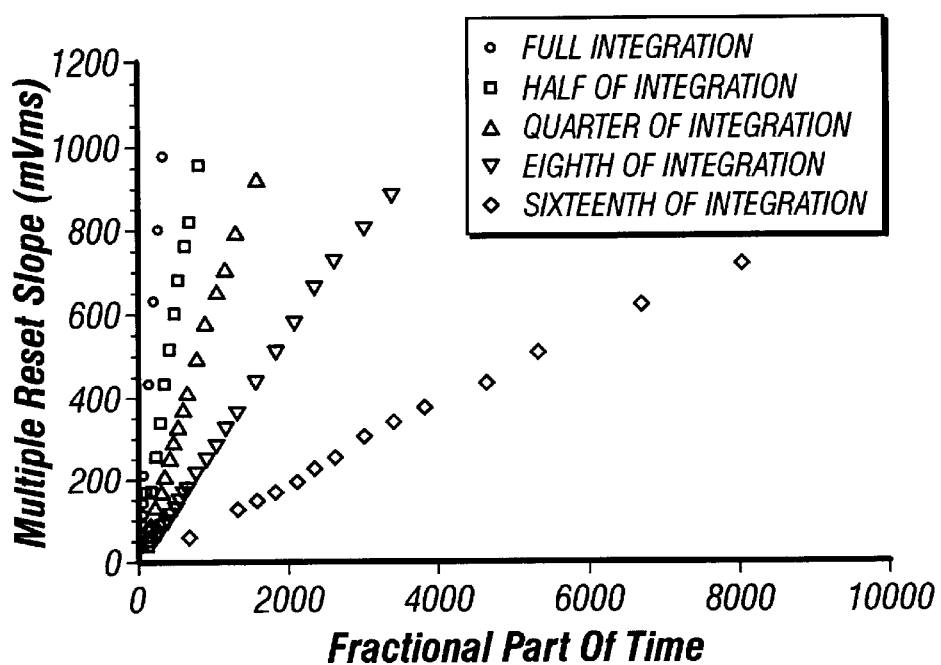
FIG. 9 shows sensor output as a function of integration time for various exposure settings of the invention.
Figure 10:
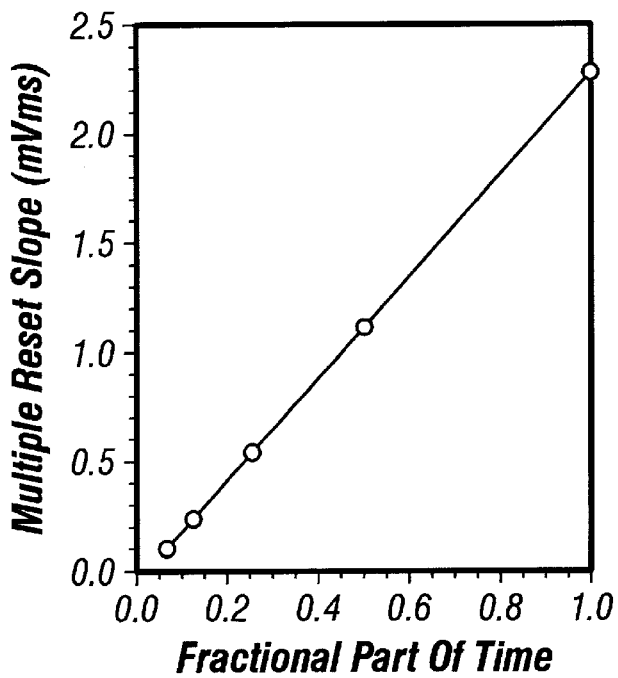
FIG. 10 shows the linearity of exposure control in accordance with the invention.

The linearity of the "electronic shutter" operation of the invention was measured by measuring sensor output as a function of integration time, for various exposure settings, but with the same scene illuminance. The output as a function of integration time is shown in FIG. 9. The slopes of these curves are plotted as a function of exposure setting in FIG. 10. This shows that the linearity of the electronic shutter of the invention is quite good. Unexpectedly, a greater response was obtained from pixels with smaller designed fill factor.

It should be noted that the techniques of the invention can be applied to photodiode-type APS pixels, as well as photogate-type APS pixels. The excellent linearity of the electronic shutter operation will also permit the use of the architecture in detector arrays for non-imaging applications, such as spectroscopy, where very large dynamic range between nearby channels must be accommodated.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. An imaging device comprising:
   an array of pixel cells, arranged in columns and rows, each pixel cell comprising a photo-sensitive element capable of generating an output indicative of incoming electromagnetic radiation, a logical reset transistor having a source coupled to control said photo-sensitive element and a drain biased at a potential, a row reset transistor having a gate to receive a row reset signal, a drain to receive a column reset signal, and a source connected to a gate of said logical reset transistor to reset said photo-sensitive element when both said row and column reset signals are high;
   a control circuit coupled to control said array;
   a row reset control element coupled between the control circuit and each pixel cell in said array to produce said row reset signal; and
   a column reset control element coupled between said control circuit and each pixel cell in said array to produce said column reset signal, wherein said row and column reset control elements are operable to randomly reset any pixel cell independently.

2. An imaging device as in claim 1 wherein each of the row and column reset control elements includes a decoder to decode a respective control signal from said control circuit.

3. An imaging device as in claim 1 further including a readout circuit that comprises a field effect source follower output transistor.

4. An imaging device as in claim 3, further comprising:
   a row readout control circuit coupled to each row of pixel cells and selecting individual rows for readout; and
   a column readout control circuit coupled to each column of pixel cells to select a column for output.

5. An imaging device as in claim 3 wherein said readout circuit includes a reset output terminal to produce a signal indicative of an output level of said photo-sensitive element during reset and a sample output terminal to produce a signal indicative of an output level of said photo-sensitive element after completing an integration.

6. An imaging device as in claim 1 further comprising a monolithic semiconductor integrated circuit substrate on which said array of pixel cells, said control circuit, said row and column reset control elements are formed.

7. An imaging device as in claim 1 further comprising a readout circuit coupled to said array and said control circuit, wherein said control circuit is operable to modify a timing of at least one of said row and column reset signals in response to a readout circuit output, whereby the dynamic range of the imaging device is modified.

8. An imaging device, comprising:
   a substrate; and
   an array of pixel cells formed on said substrate and arranged in columns and rows, each pixel cell comprising:
      a photo sensor responsive to input radiation to produce a pixel output signal,
      a first transistor having a source coupled to said photo sensor and a drain coupled to a bias potential, and
      a second transistor having a source coupled to a gate of said first transistor, and a gate coupled to receive a row reset signal, and a drain coupled to receive a column reset signal, wherein said first transistor is on to reset said photo sensor when both said column reset and row reset signals are high.

9. A device as in claim 8, wherein said photo sensor includes a photodiode.

10. A device as in claim 8, wherein said photo sensor includes a photogate.

11. A device as in claim 8, further comprising a readout circuit coupled to said photo sensor to receive said pixel output signal.

12. A device as in claim 11, further comprising a control circuit coupled to said readout circuit and said array to receive an output signal from each of said pixel cells, said control circuit operable to adjust an integration time of a pixel cell by controlling at least one of said row reset and column reset signals in response to an output signal from said pixel cell.

13. A device as in claim 8, wherein each of said pixel cells is an active pixel cell.

* * * * *